Nov. 29, 1966    H. C. GILLILAND    3,287,980
SPEEDOMETER CABLE ACCESS
Filed July 30, 1964      4 Sheets-Sheet 1

INVENTOR.
Howard C. Gilliland
BY
His Attorney

Nov. 29, 1966  H. C. GILLILAND  3,287,980
SPEEDOMETER CABLE ACCESS

Filed July 30, 1964  4 Sheets-Sheet 2

INVENTOR.
Howard C. Gilliland
BY
*Albert H. Reuther*
His Attorney

Nov. 29, 1966 H. C. GILLILAND 3,287,980
SPEEDOMETER CABLE ACCESS
Filed July 30, 1964 4 Sheets-Sheet 3

INVENTOR.
Howard C. Gilliland
BY
His Attorney

Nov. 29, 1966  H. C. GILLILAND  3,287,980
SPEEDOMETER CABLE ACCESS

Filed July 30, 1964  4 Sheets-Sheet 4

INVENTOR.
Howard C. Gilliland
BY
His Attorney

United States Patent Office 3,287,980
Patented Nov. 29, 1966

---

3,287,980
SPEEDOMETER CABLE ACCESS
Howard C. Gilliland, Flint, Mich., assignor to General Motors Corporation, Detroit, Mich., a corporation of Delaware
Filed July 30, 1964, Ser. No. 386,337
4 Claims. (Cl. 73—493)

This invention relates to speedometer means and, more particularly, to speedometer cable access to permit installation and removal with less time and effort.

Presently considerable time is needed for speedometer servicing and cable access because of difficulty encountered in limited space behind and underneath an instrument panel or dashboard means of a vehicle.

Tools and hands of an individual often cannot properly grip fastening components on previous speedometer installation particularly since speedometer means could only be removed rearwardly of the instrument panel or dashboard means.

Accordingly, it is an object of the present invention to provide new and improved access to speedometer means and cable assembly thereto requiring less time and effort by enabling servicing of speedometer cable from the front or passenger side of instrument panel or dashboard means.

Another object of this invention is to provide a speedometer cable disconnect and connect means having a spring loaded tapered interfit internally and a plastic coupler portion that engages only a speedometer housing means including complementary slot and projection configuration therebetween for less than full turn to effect connection and disconnection.

Another object of this invention is to provide, in combination, a plastic coupler portion having an annular body portion thinned peripherally toward one end having plural outward projections thereon adapted to engage bayonet slots of a speedometer housing that can be held in a vehicle dashboard or instrument panel means by readily removable fastening means and replaceable from a passenger side thereof, the body portion further having an inwardly extending annular end which meets with an islet also of insulating material in which one end of a spring means is embedded to bias a tapered end shield for a flexible cable speedometer drive and serviceable also from a passenger side of the dashboard or instrument panel means due to front removal of the speedometer means.

A further object of the present invention is to provide, in combination, on a vehicle instrument panel means having a socket pocket accessible from a passenger side thereof where spring retainer means are secured subject to deflection by set screw means to hold a covered instrument such as a speedometer in place for removal from the passenger side to open socket access to rear extension of the speedometer or instrument housing having hook shaped slots along inner periphery of the extension into which a cable coupler of insulating material is insertible with a limited turning or twist movement for connect and disconnect of plural outward lugs of the cable coupler for access as to the cable and speedometer as disassemblies completely serviceable from the passenger side of the vehicle dashboard or instrument panel means.

Another object of the present invention is to provide speedometer cable means having a metal core drive portion surrounded by a sleeve liner of plastic such as acetal resin terminating within a cylindrical end portion of a substantially tapered sleeve portion also of plastic as flared outwardly to an opposite end engaged by a free ending of spiral spring means having another ending embedded in a flange of a plastic islet portion journaled peripherally and radially outwardly on the cylindrical end portion as well as interlocked with an inwardly extending annular flange of an outer coupling portion with plural outward projections engageable and disengageable as to hook-shaped fastening slots of an extension of a speedometer housing means and resiliently maintained in biased engagement therewith as well as with mating tapered surfacing of a plastic end pin of the metal core drive portion of the cable means as to a driven speedometer means member.

Further objects and advantages will be apparent from the following description, reference being made to the accompanying drawings wherein preferred embodiments of the present invention are clearly shown.

Presently, a flexible shaft assembly is attached to a speedometer means by use of an internal threaded coupling nut on a ferrule, used as a union joint, swaged to a casing of the flexible shaft assembly. This coupling nut is screwed to the back of a speedometer frame or speedometer case. The speedometer frame or case is mounted securely in an instrument cluster housing before the coupling nut is attached. To attach the coupling nut it is necessary to work in very limited space in a location up under the dashboard of a vehicle where the instrument cluster housing is attached. This arrangement not only is awkward for installation but for service as well.

Figure 1:
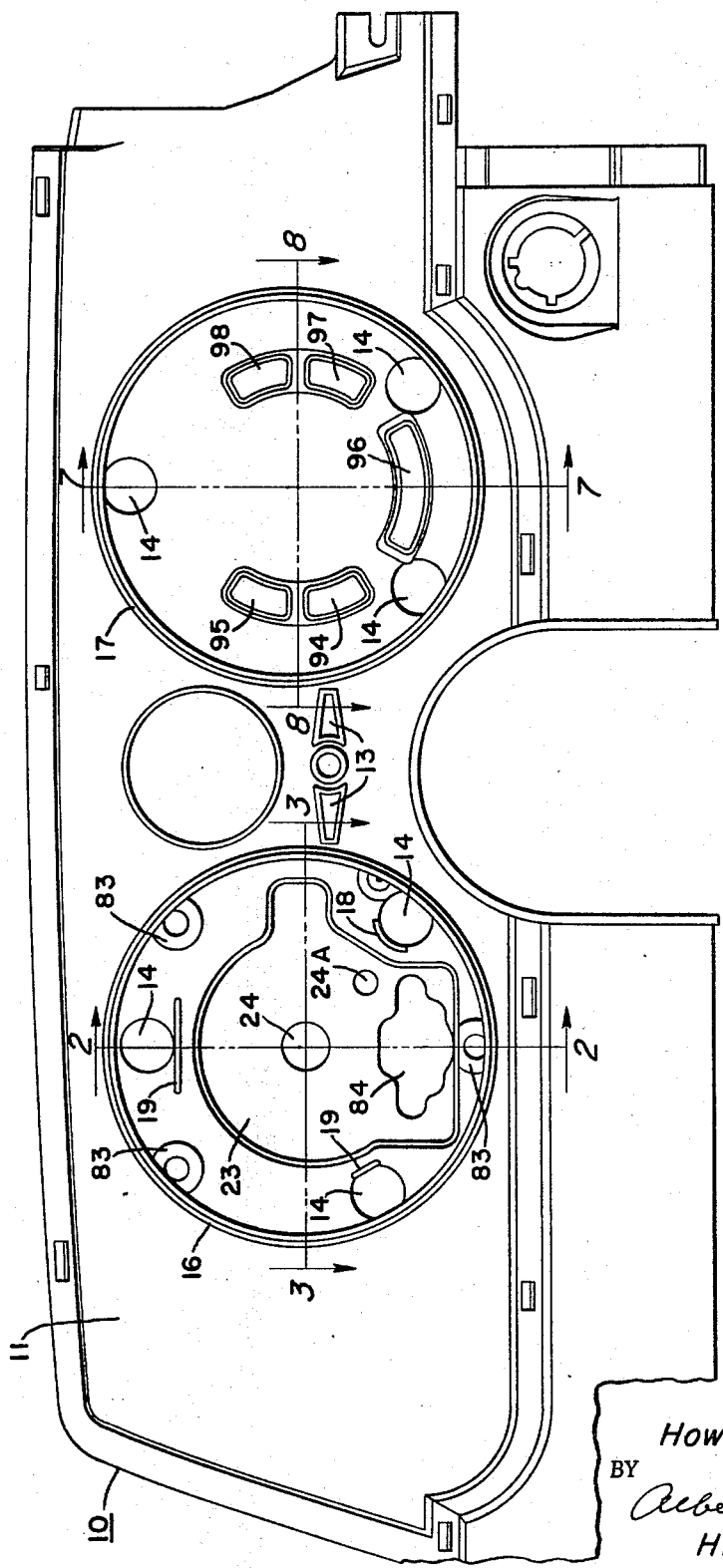
FIGURE 1 is a plan view of dashboard or instrument panel means having features in accordance with the present invention.
Figure 7:
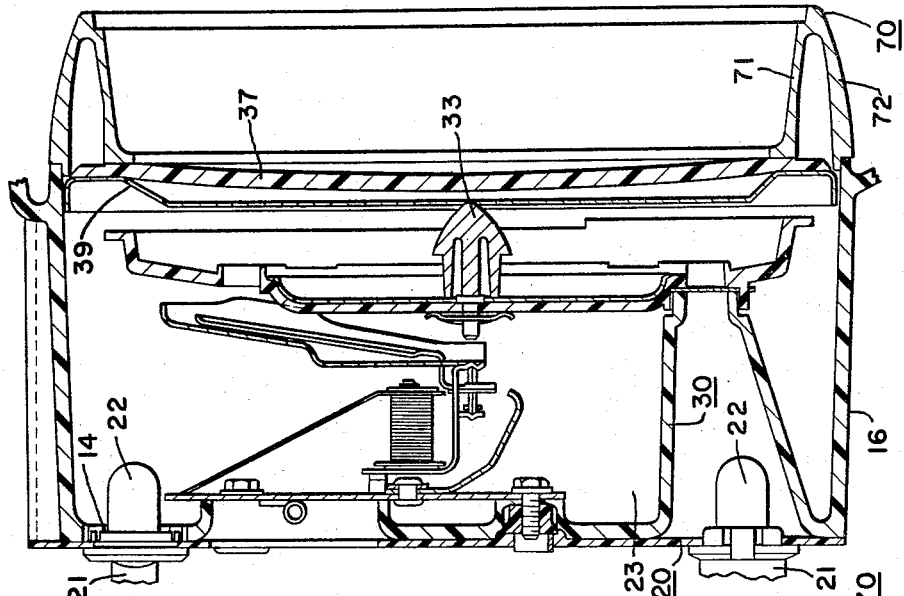
FIGURE 7 is a cross-sectional view taken along line 7—7 in FIGURE 1.

Thus, to replace a worn or broken speedometer cable or speedometer mechanism per se in the present known installations as cited in the foregoing paragraph requires working under the dashboard panel as well as removal of the complete cluster assembly to replace any parts requiring service. Features of the present invention permit attachment of a quick connect means free of any screw-thread coupling portion to be attached directly to an instrument cluster housing means generally indicated by numeral 10 in FIGURE 1 as well as in views of FIGURES 2-3 and 7-8. This instrument cluster housing means can be made of suitable plastic material such as acetal resin, polyamide and other moldable plastic composition to include a body portion 11 having a predetermined configuration for clustering of instrument panel accessories such as speedometer means, light or directional signal indicators 13, as well as various gauge means or condition indicators to be noted subsequently herein. The configuration of the body portion 11 can be substantially complementary to a further assembly of lamp socket means with printed circuit mounting as disclosed by a Patent 2,825,038—Woofter issued February 25, 1958 to the assignee of the present invention. It is to be understood that lamp socket means in accordance with this patent can be provided and also lamp socket means in accordance with a Patent 3,017,599—Loesch issued January 16, 1962 can be used and also belonging to the assignee of the present invention. Suitable openings 14 can be provided within peripheral confines of substantially cylindrical extensions 16 and 17 of the body portion 11 of plastic material also having integral shielding walls arcuate as indicated by reference numeral 18 or substantially tangentially and straight as indicated by numeral 19 in locations adjacent to certain openings 14 through which suitable lamp bulb means project as mounted by the printed circuit cluster noted previously. These lamp bulb means and the printed circuit cluster are not shown in the view of FIGURE 1 though in views of FIGURES 2 and 7-8 such a printed circuit assembly indicated generally by numeral 20 can be seen including lamp socket means 21 secured thereto with bulbs 22 and substantially in accordance with the disclosure of Patent 3,017,599—Loesch noted earlier. The shielding means 18-19 are located laterally to one side of the lamp bulb means 22 where necessary to avoid excessive glare and lighting and it is noted that suitable fastening means or screws can be provided to preassemble the printed circuit means to the body portion 11 at sufficient locations. The body portion 11 has the sockets or cylindrical extensions 16 and 17 integral therewith and the extension 16 is provided with an irregular-shaped recessing or cavity 23 having a centrally-located opening 24 therethrough as indicated in views of FIGURES 1 and 2 of the drawings. Located rearwardly from a back wall portion and integrally therewith is an annular projection 25 of the extension or speedometer housing means 16 of moldable plastic material having the central passage or opening 24 therein. As best seen in views of FIGURES 2 and 6, this annular projection 25 has an internal and substantially cylindrical periphery 26 recessed or slotted outwardly to include a longitudinal or axial groove 27 as well as a transverse or lateral termination 28 thereof in a location radially outwardly from a tapered shaft extension 29 of a speedometer means generally indicated by numeral 30 in views of FIGURES 2-3 and 7. The specific operating mechanism of the speedometer means 30 per se can be of any suitable type including a bezel 31 as well as a speed-indicating pointer 32 secured by a hub 33 to a shaft 34 in a usual manner as well as including a supplemental speed warning indicator 35 on a concentric sleeve 36 as to the shaft 34 to be adjustable for a buzz or audible sounding means. A suitable transparent panel 37 having digits or numerals 38 on one side thereof can be provided substantially axially in alignment with the end of the needle or pointer 32 of the speedometer means. An annular shield 39 shown in views of FIGURES 2 and 7 can be provided for reflection and deflecting of light rays emanating from the light bulb means or from daylight along a passenger side of the dashboard panel means.

Figure 4:
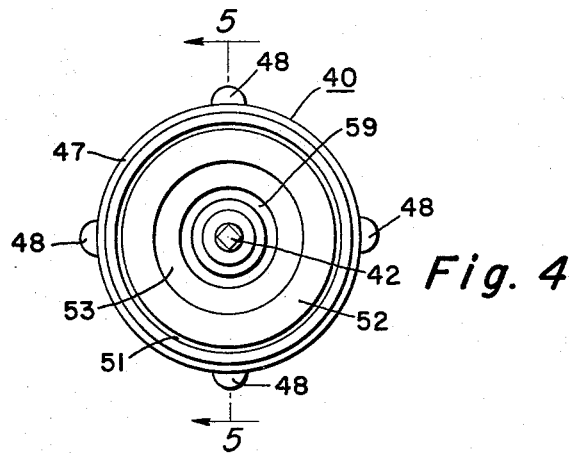
FIGURE 4 is an end view of a coupler and flexible cableshaft means for use with the structure of FIGURE 2.
Figure 5:
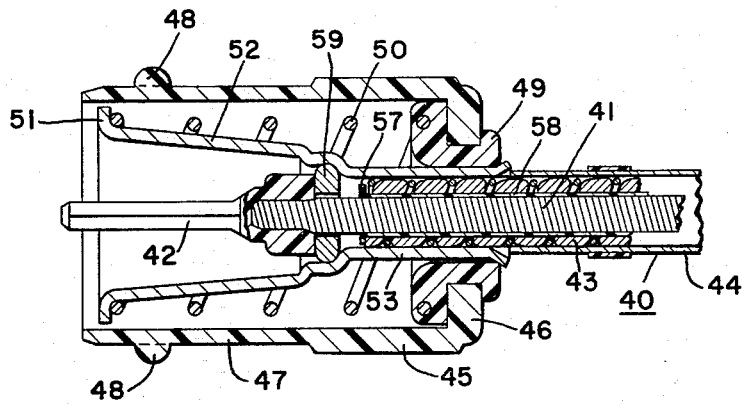
FIGURE 5 is an enlarged cross-sectional view taken along line 5—5 in FIGURE 4.
Figure 6:
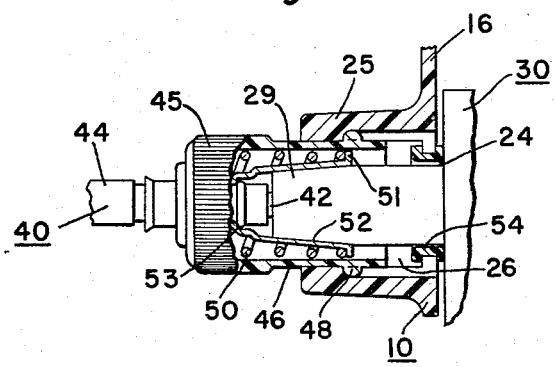
FIGURE 6 is a fragmentary sectional view of structures of FIGURES 2 and 4–5 assembled to each other.

A flexible shaft assembly generally indicated by numeral 40 in FIGURES 4 and 5 can include a metallic core 41 having an ending 42 for driving connection to the projection 29 of the speedometer means in a usual telescopic interfit thereof. Suitable spiral sheath means 43 and an outer protective sleeve 44 for the speedometer cable assembly 40 can be provided in a usual manner subject to mounting thereon of a plastic coupler portion 45 having a radially inwardly extending and centrally apertured end 46 as well as a reduced thickness annular or cylindrical portion 47 with a plurality of radially outwardly extending lugs 48 as shown in views of FIGURES 4 through 6 inclusive. The coupler portion 45 can have axial ribbing peripherally outwardly thereon to permit positive finger engagement thereof though the lugs or projections 48 can be located in substantially diametrically opposite locations as indicated in FIGURE 4 and each engageable with the longitudinal portion 27 as well as the transverse ending 28 thereof of the slot or recess configuration in the speedometer housing means extension 25. FIGURE 6 represents an assembled view of the plastic coupler portion 45 such that the reduced diameter 46 extension there as well as the lugs 48 engage the extension 25 in a bayonet-fastening interfit requiring less than a full circular turn of the mating parts. An annular grommet 49 having one end of a coil spring means 50 embedded and carried thereby can be provided concentrically within the coupler portion 45 of plastic material. A free end of the spring means 50 can engage an outwardly flared end 51 of a tapered portion 52 of a bell member 53 located concentrically around the ending of the speedometer cable means 41–42. A suitable thrust washer or grommet 54 indicated in FIGURE 6 can be provided and also it is to be understood that necessary thrust washer means 57 can be provided on an acetal resin liner portion 58 provided concentrically around the cable means 41. Such acetal resin liner 58 can assure silent turning and operation of the speedometer cable means with a minimum of lubrication and a suitable washer means 59 can also be provided between the ending 42 and the bell portion 53 in a location adjacent to the swaging of the ending 42 to the cable means 41. The interfit of the plastic coupler portion 45–46–47–48 as to the J-shaped configuration of slots or recessing 27–28 in the extension 25 of the speedometer housing means permits a quick connect of the flexible shaft assembly with a bayonet-type lock requiring less than a full rotation or turning of any parts. The tapered configuration of the bell portion or ferrule 52–53 under spring pressure keeps the flexible shaft means engaged with a mating taper extension or projection 29 provided as a speedometer neck or drive connection. It is to be noted that the plastic coupler portion can remain engaged with the speedometer housing means subject to removal of the speedometer means 30 from a front side of the instrument panel.

Figure 2:
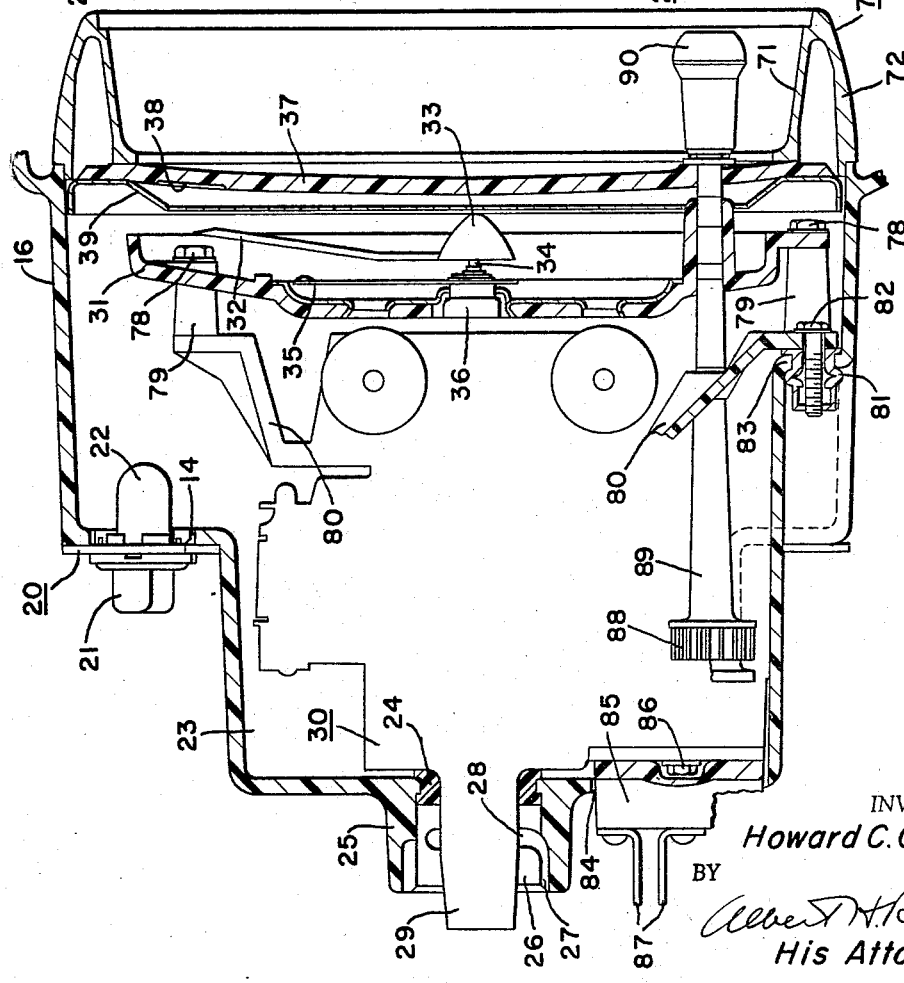
FIGURE 2 is a cross-sectional view taken along line 2—2 in FIGURE 1.
Figure 3:
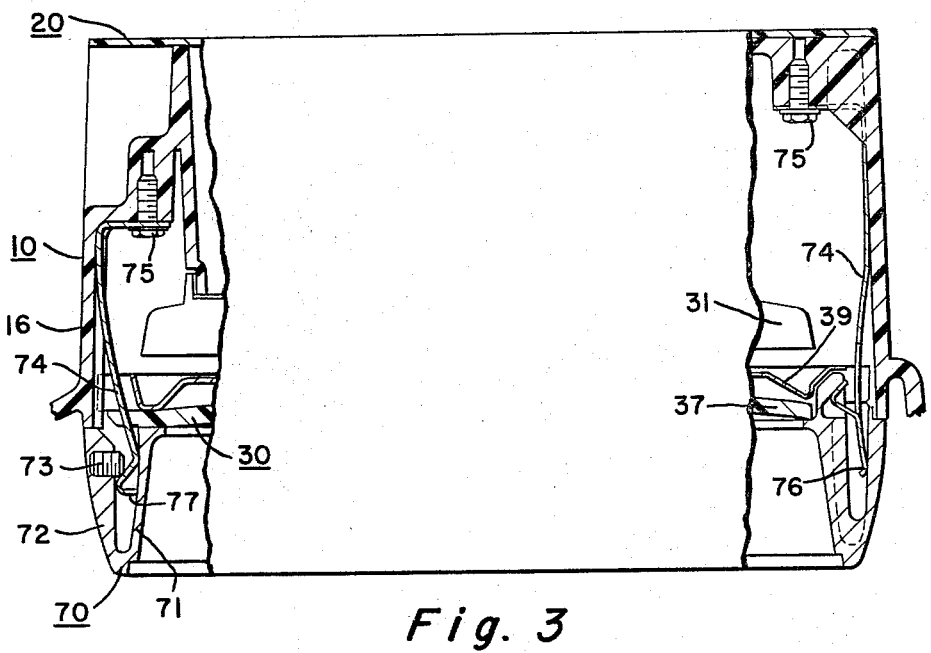
FIGURE 3 is a cross-sectional view taken along line 3—3 in FIGURE 1.

Removal of speedometer means from a front or passenger side of the instrument panel is made possible by provision of a cover portion or annular centrally-open member generally indicated by numeral 70. This member 70 includes an inner portion 71 as well as an outer portion 72 as can be seen in views of FIGURES 2, 3 and 7 subject to provision of a radially adjustable set screw or fastening means 73 as to the outer portion 72 as can be best seen in FIGURE 3. A plurality of spring arms 74 can be secured by fastening means or screws 75 to the speedometer housing means 16 in suitable locations. These spring arms have free ends 76 subject to modification of one arm to have a V-shaped ending 77 engageable by the adjustable fastening means 73 which when moved radially inwardly results in a tight engagement of the inner periphery of the inner portion 71 as can be seen in FIGURE 3. Thus the member 70 can be removed from a passenger or front side of the vehicle dashboard providing access to mounting screws or fasteners 78 which threadedly engage mating projections 79 of a speedometer mounting bracket 80 extending outwardly from a speedometer housing per se. The speedometer mounting bracket 80 can be secured by toggle means 81 and fasteners or screws 82 as indicated in FIGURE 2.

The speedometer housing means or plastic body portion 16 for mounting thereof can have a transverse rear wall provided not only with the central opening or aperture 24 but also an additional opening 84 through which a body or member 85 can be secured to one side of the speedometer means 30 by suitable fastening means 86. This member 85 can have plural male terminal means 87 projecting rearwardly therefrom for engagement by female terminal means establishing electrical connection such as for the buzzer or warning indicator means for which the setting needle 35 is provided as noted previously. Also a suitable sprocket or gear member 88 indicated in FIGURE 2 can be provided with a shaft extension 89 as well as a setting knob 90 located internally of the member 70 and to one side of the transparent panel 37. This knob 90 can serve as a means for turning the sprocket 88 by way of the shaft extension 89 for adjustment of a trip-mileage indicator that can be provided on the speedometer means in a well known manner. It is to be understood that the sprocket 88 can be eliminated and in place of the shaft 89 a flexible cable could also be connected to the knob 90 and this cable could be secured to a suitable drive member extending rearwardly from the speedometer means subject to a quick-connected coupling also having bayonet-type fastening in a location adjacent to the description of similarly provided structure of FIGURES 2 and 4–6.

Use of the toggle fastening means 81 together with the screws or fasteners 82 permits mounting of the speedometer bracket 80 extending outwardly from the speedometer means 30. The plastic body portion 16 can include plural mounting portions 83 indicated in views of FIGURES 1 and 2. Thus the entire bracket and speedometer means can be removed only from a front or passenger side of the dashboard assembly and the tapered projection 29 is releasable from driving engagement with the ending of the speedometer cable means also from a front side. The quick connect means remains attached to the speedometer housing 16 including the extension 25 thereof though it is to be understood that the speedometer cable means per se can also be serviced individually without removal of the speedometer means per se by less than 360° turning of the plastic coupler portion 45 as noted earlier. However, the speedometer cable means can be replaced also from the passenger or front side of the instrument panel without need for removal of the entire instrument cluster. When being replaced from the passenger side of the instrument panel, the speedometer cable can be reached by removing the speedometer mounting screws or fasteners permitting temporary disassembly of the projection 29 of the speedometer means from the tapered portion 52 of the speedometer cable assembly providing direct access to the ending 42 and speedometer cable means 41 which can be pulled easily through the recessing 23 of the annular portion 16 of the plastic body or panel structure 11. This reduces service time and the cost of replacing cables as well as facilitating work and repair of speedometer means per se. A similar convenient removal of the trip-mileage indicator is provided together with access to the speed-warning buzzer means and additional structure and connections. Use of a flexible shaft and reset knob with such bayonet-type fastening as illustrated for the speedometer cable means attachment can be provided also and such connection can be made in a location outlined in FIGURE 1 between the opening 84 and central passage 24 and indicated by reference numeral 24A.

Figure 8:
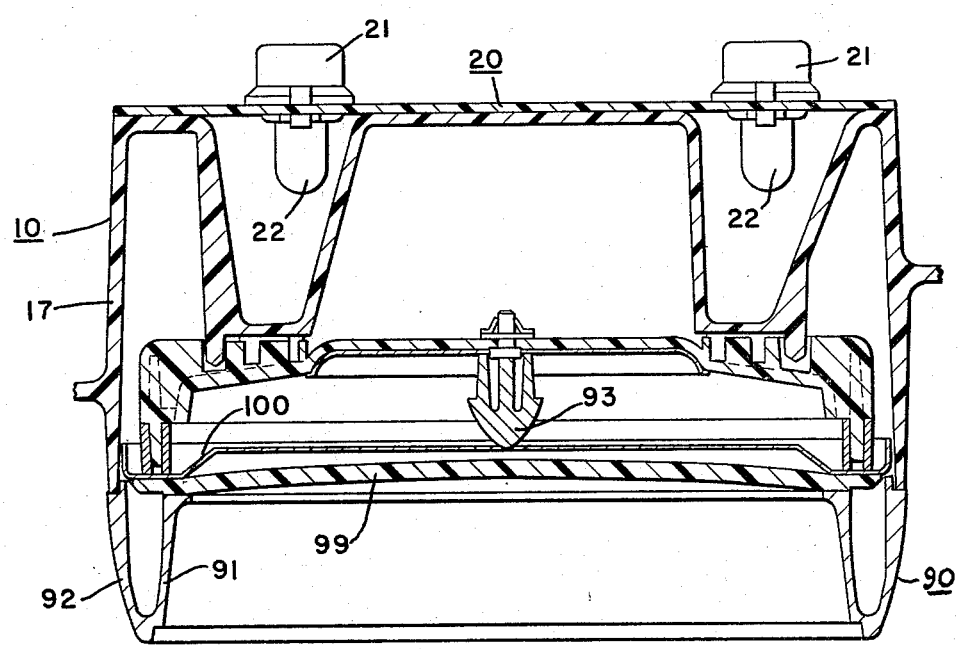
FIGURE 8 is a cross-sectional view taken along line 8—8 in FIGURE 1.

FIGURE 8 illustrates in further detail application of features of the present invention also to the gauge or indicator means that can be provided on the instrument panel in a location radially within the confines of the annular portion 17. A member generally indicated by numeral 90 in FIGURE 8 corresponds to the member 70 in FIGURE 7 and includes an inner portion 91 as well as an outer portion 92 subject to engagement by spring arms similar to those indicated by numeral 74 in FIGURE 3. A fastening or set screw means similar to that indicated by numeral 73 in FIGURE 3 can be provided also for the member 90 in FIGURE 8. A central button or tapered member 93 can be provided in the structure of FIGURE 8 to simulate the indicator or pointing mounting means 33 of FIGURES 2 and 7. A pair of openings 94 and 95 indicated in FIGURE 1 can be provided for light bulb warning indication of insufficient oil pressure for example, and a similar opening 96 can be provided for a temperature indicating means as well as openings 97 and 98 for additional warning light indicators such as for temperature and/or fuel gauge installation. The specific location of such indicating means can be suitably varied. However, the member 90 is again removable from the passenger side of the instrument panel thus providing service and replacement access to the gauge or indicator means so mounted. A suitable transparent panel 99 indicated in FIGURE 8 can be provided also centrally of the member 90 together with a shielding member or baffle 100 for deflection of light from opposite sides depending on electrical illumination or daylight for visibility purposes.

It is to be noted that the tapered bell portion 52–53 can be readily guided and caused to interfit and engage the projection 29 of the speedometer means subject to spring-loading thereof between the ferrule and plastic coupler portion 45–46. The plastic coupler portion engages with the speedometer housing means or extension 25 only and the speedometer means 30 per se can be readily removed even when the coupler portion remains engaged with the plastic housing portion. By provision of four lugs 48 it is necessary only to require a quarter turn either in a right or left hand direction for disconnecting the speedometer cable means when desired though regardless of interconnection of the speedometer cable means the speedometer means per se as an assembly is freely accessible from a front or passenger side of the dashboard or instrument panel means for removal or installation. The spring-loaded tapered ferrule means 52–53 protects the cable tip or ending 42 during shipping as well as during installation. Features of the present invention facilitate speedometer means and cable servicing regardless of limited space.

While the embodiments of the present invention herein disclosed constitute preferred forms, it is to be understood that other forms might be adopted.

What is claimed is as follows:

1. In combination, a plastic coupler portion having an annular body thinned peripherally toward one end having plural outward projections thereon, and a speedometer housing for vehicle instrument panel installation having passage-forming portion with substantially J-shaped slots engaged by said outward projections of said plastic coupler portion, said annular body further having an inwardly extending annular end which mates with an islet also of insulating material in which one end of a spring means is embedded, a tapered end shield for a flexible cable speedometer drive tip located axially of said annular body and said spring means, said shield having an outwardly flanged portion engaged by a free end of said spring means, said plastic coupler portion engaging only said speedometer housing to permit speedometer cable access for servicing from a passenger side of dashboard location upon front removal of speedometer means.

2. On a speedometer cable means having a metal core drive portion surrounded by sleeve liner of plastic material exemplified by acetal resin terminating within a cylindrical ending of a substantially tapered sleeve portion flared outwardly, a speedometer housing structure and mating plastic coupler comprising, an annular body portion having a reduced thickness wall and integral locking lugs adjacent to one end thereof and an inwardly extending flange at an opposite end adjacent to cable means, a plastic islet portion journaled peripherally and radially outwardly on the cylindrical ending as well as interlocked with said inwardly extending flange, and spring means extending between said plastic islet portion and the outwardly flared tapered sleeve portion, said lugs engaging substantially J-shaped slots of speedometer housing structure for interfit with less than a full rotative turning movement in limited access space.

3. The structure of claim 2 wherein said spring means has one end embedded in said islet portion and said lugs total four in number so that only a quarter turning is needed for assembly and disassembly of said plastic coupler.

4. The structure of claim 2 wherein said spring means resiliently biases the tapered sleeve portion axially of the cable means both for cable tip protection during shipping as well as installation and for resilient mating engagement of speedometer means per se upon installation.

References Cited by the Examiner

UNITED STATES PATENTS

| | | | |
|---|---|---|---|
| 1,461,628 | 7/1923 | Patrick | 64—4 X |
| 3,015,718 | 1/1962 | Petri. | |
| 3,074,253 | 1/1963 | Osterhoudt | 64—4 |
| 3,165,273 | 1/1965 | Fahrbach | 64—4 X |
| 3,211,485 | 10/1965 | Petersen | 64—4 X |

OTHER REFERENCES

German Application 1,140,352—11/1962 Jaedicke.

RICHARD C. QUEISSER, *Primary Examiner.*

J. J. GILL, *Assistant Examiner.*